J. M. WEED.
WELDING ELECTRODE.
APPLICATION FILED NOV. 4, 1918.
1,304,227.
Patented May 20, 1919.
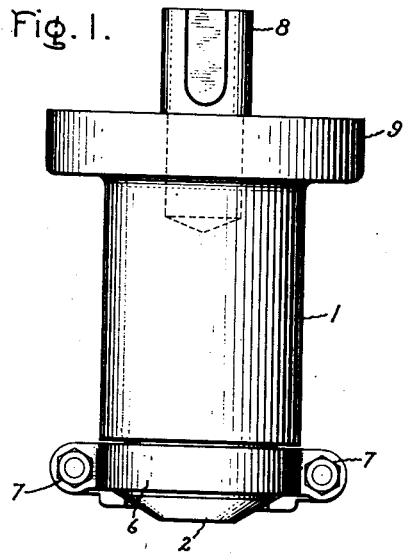
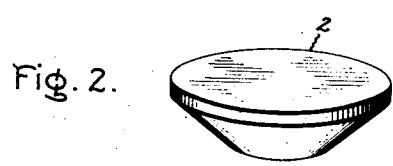
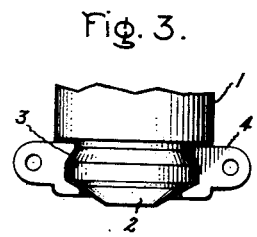
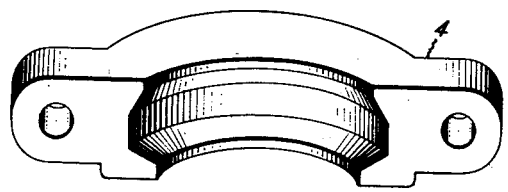
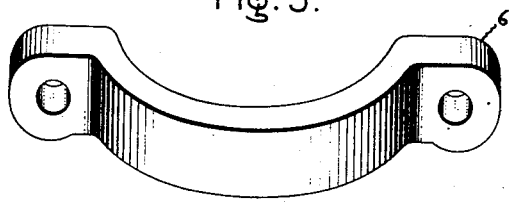
Inventor:
James M. Weed,
by Albert G. Davis
His Attorney.

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

WELDING-ELECTRODE.

1,304,227.  Specification of Letters Patent.  Patented May 20, 1919.

Application filed November 4, 1918. Serial No. 260,937.

*To all whom it may concern:*

Be it known that I, JAMES M. WEED, a citizen of the United States, residing at Schenectady, in the county of Schenectady, State of New York, have invented certain new and useful Improvements in Welding-Electrodes, of which the following is a specification.

The present invention comprises an improvement in electric resistance welding electrodes, and particularly to spot welding electrodes.

It is the object of my invention to provide an electrode which may be readily kept in the proper condition for welding, that is, the welding face of which may be conveniently maintained true and of a desired shape for efficiently making welds. It is necessary or desirable, therefore, that the electrodes should be of a material which is not only sufficiently rigid to bear the high mechanical pressure when cold, but also which possesses high electrical and heat conductivities, so that the heat generated in the electrode itself and at its surface of contact with the work will not raise the temperature of the electrode to the softening point. Copper comes most nearly meeting all of these requirements although, being considerably softer than steel, which is the material ordinarily welded, the tip of the electrode is gradually deformed and worn. This degree of softness in the electrode tip is an advantage in obtaining more intimate contact between it and the work, thus minimizing the electrical resistance and the consequent heating at this point. Still the consequent wear and gradual spreading of the tip makes occasional repair or renewal necessary.

In accordance with my invention, I have provided an electrode having a separable tip, preferably having a frusto-conical shape. This tip is held into engagement with the body of the electrode by means of a clamp engaging with the welding tip and encircling the end of the electrode body which is preferably machined so that pressure is applied by the clamp to force the welding tip into engagement with the electrode body.

In the accompanying drawing, Figure 1 shows an assembled welding head in perspective; Fig. 2 shows the welding tip in perspective; Fig. 3 is a part sectional view showing the relation of the welding tip, and the clamp, and Figs. 4 and 5 illustrate the clamp in perspective.

The body of the welding head 1 is preferably of larger diameter than the welding tip 2 which engages with the work. In order that the whole welding tip may be firmly held against the welding head, the welding head is machined at its end to provide a shoulder, as shown at 3 in Fig. 3, against which the strap 4 of the clamp rests. Engaging with the semicircular holder 4 of the clamp is a demountable strap 6, as shown in Fig. 5. When the strap 6 is pressed into engagement with the holder 4 by means of bolts 7 (Fig. 1), pressure is applied between the ring 5 and the welding head 1. Therefore when the frusto-conical tip 2 is placed between the ring and the welding head it is forced into close engagement with the welding head by tightening the bolts 7. The welding head 1 is adapted to be attached to the welding machine by a steel shank 8, the application of the welding pressure forcing the shoulder 9 into close contact with the current carrying parts of the machine so as to establish a good electrical contact.

What I claim as new and desire to secure by Letters Patent of the United States, is:—

1. A resistance welding electrode comprising a head, a welding tip for the end of said head and a demountable clamp for holding said tip into engagement with said head.

2. A resistance welding electrode comprising a head, a separable frusto-conical welding tip therefor, and means for holding said tip into engagement with said head.

3. A spot welding electrode comprising a welding head, a separable frusto-conical tip therefor, and a clamp for holding said tip into engagement with the end of said electrode, said clamp comprising a ring engaging with said tip and encircling the end of said welding head.

In witness whereof, I have hereunto set my hand this 31st day of October, 1918.

JAMES M. WEED.